United States Patent
Lee et al.

(10) Patent No.: US 10,264,441 B2
(45) Date of Patent: Apr. 16, 2019

(54) METHOD AND APPARATUS FOR PERFORMING DISCOVERY BY DEVICE SUPPORTING WI-FI DIRECT IN WIRELESS COMMUNICATION SYSTEM

(71) Applicant: LG ELECTRONICS INC., Seoul (KR)

(72) Inventors: Byungjoo Lee, Seoul (KR); Dongcheol Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 15/523,339

(22) PCT Filed: Oct. 29, 2015

(86) PCT No.: PCT/KR2015/011523
§ 371 (c)(1),
(2) Date: Apr. 28, 2017

(87) PCT Pub. No.: WO2016/068632
PCT Pub. Date: May 6, 2016

(65) Prior Publication Data
US 2017/0251354 A1   Aug. 31, 2017

Related U.S. Application Data

(60) Provisional application No. 62/069,862, filed on Oct. 29, 2014.

(51) Int. Cl.
*H04W 4/00* (2018.01)
*H04W 8/00* (2009.01)
(Continued)

(52) U.S. Cl.
CPC ............ *H04W 8/005* (2013.01); *H04L 43/12* (2013.01); *H04L 67/16* (2013.01); *H04W 4/80* (2018.02);
(Continued)

(58) Field of Classification Search
None
See application file for complete search history.

(56) References Cited

U.S. PATENT DOCUMENTS 9,154,934 B2 * 10/2015 Yang ..................... H04W 8/005
9,167,615 B2 * 10/2015 Lee ..................... H04W 76/023
(Continued)

FOREIGN PATENT DOCUMENTS

KR   1020130079839   7/2013
KR   1020140020179   2/2014
(Continued)

OTHER PUBLICATIONS

PCT International Application No. PCT/KR2015/011523, Written Opinion of the International Searching Authority dated Feb. 15, 2016, 15 pages.
(Continued)

*Primary Examiner* — Bob A Phunkulh
(74) *Attorney, Agent, or Firm* — Lee Hong Degerman Kang Waimey

(57) ABSTRACT

One embodiment of the present invention relates to a method for performing discovery by a device supporting Wi-Fi Direct, the method comprising the steps of: calling, by a service end, a SeekService method and an AdvertiseService method; and transmitting a probe request on the basis of at least one of the SeekService method and the AdvertiseService method, wherein when the type field of the SeekService method is active and the periodic field of the AdvertiseService method is 1 or higher, the probe request
(Continued)

includes a service hash generated from the service_name of the SeekService method, and a service hash and an advertisement ID generated from the service_name of the AdvertiseService method.

8 Claims, 8 Drawing Sheets

(51) Int. Cl.
    *H04W 48/14*     (2009.01)
    *H04W 92/18*     (2009.01)
    *H04W 4/80*     (2018.01)
    *H04L 12/26*     (2006.01)
    *H04L 29/08*     (2006.01)
    *H04W 76/14*     (2018.01)
    *H04W 84/12*     (2009.01)

(52) U.S. Cl.
    CPC ........... *H04W 48/14* (2013.01); *H04W 92/18* (2013.01); *H04W 76/14* (2018.02); *H04W 84/12* (2013.01)

(56) References Cited

U.S. PATENT DOCUMENTS

| | | | |
|---|---|---|---|
| 9,619,646 B2 * | 4/2017 | Huang | H04W 76/14 |
| 9,832,596 B2 * | 11/2017 | Huang | H04L 67/16 |
| 2014/0044114 A1 * | 2/2014 | Lee | H04W 76/023 |
| | | | 370/338 |
| 2014/0293978 A1 * | 10/2014 | Yang | H04W 8/005 |
| | | | 370/338 |
| 2014/0337544 A1 * | 11/2014 | Huang | G06F 13/385 |
| | | | 710/63 |
| 2014/0349578 A1 * | 11/2014 | Huang | H04L 67/16 |
| | | | 455/41.2 |
| 2014/0351445 A1 * | 11/2014 | Davidson | H04W 8/005 |
| | | | 709/227 |
| 2014/0351475 A1 * | 11/2014 | Huang | G06F 13/4068 |
| | | | 710/303 |
| 2014/0351476 A1 * | 11/2014 | Huang | G06F 1/1632 |
| | | | 710/303 |
| 2014/0351927 A1 * | 11/2014 | Huang | H04W 76/14 |
| | | | 726/19 |
| 2014/0355585 A1 * | 12/2014 | Sadeghi | H04W 76/14 |
| | | | 370/338 |
| 2015/0124792 A1 * | 5/2015 | Gix | H04W 48/16 |
| | | | 370/338 |
| 2015/0296416 A1 * | 10/2015 | Lee | H04W 8/005 |
| | | | 370/331 |
| 2015/0341849 A1 * | 11/2015 | Lee | H04W 48/16 |
| | | | 455/41.2 |
| 2015/0351146 A1 * | 12/2015 | Lee | H04W 8/005 |
| | | | 370/329 |
| 2016/0050551 A1 * | 2/2016 | Qi | H04W 48/10 |
| | | | 455/434 |
| 2016/0174134 A1 * | 6/2016 | Srinivasa Gopalan | H04W 48/14 |
| | | | 370/254 |
| 2016/0205199 A1 * | 7/2016 | Patil | H04W 76/14 |
| | | | 709/223 |
| 2016/0212226 A1 * | 7/2016 | Patil | H04L 67/16 |
| 2016/0360565 A1 * | 12/2016 | Li | H04W 76/14 |
| 2016/0366718 A1 * | 12/2016 | Sadeghi | H04W 76/14 |

FOREIGN PATENT DOCUMENTS

| | | |
|---|---|---|
| WO | 2014088378 | 6/2014 |
| WO | 2014123383 | 8/2014 |

OTHER PUBLICATIONS

Tieu, J. et al., "Wi-Fi Direct Services: Design and Investigation of an Emerging Wireless Technology," Master's Thesis, Department of Electrical and Information Technology, Lund University, Jun. 2014, 73 pages.

* cited by examiner

METHOD AND APPARATUS FOR PERFORMING DISCOVERY BY DEVICE SUPPORTING WI-FI DIRECT IN WIRELESS COMMUNICATION SYSTEM

CROSS-REFERENCE TO RELATED APPLICATIONS

This application is the National Stage filing under 35 U.S.C. 371 of International Application No. PCT/KR2015/011523, filed on Oct. 29, 2015, which claims the benefit of U.S. Provisional Application No. 62/069,862, filed on Oct. 29, 2014, the contents of which are all hereby incorporated by reference herein in their entirety.

TECHNICAL FIELD

The present invention relates to a wireless communication system, and more particularly, to a method for enabling a device supporting Wi-Fi Direct to perform discovery and apparatus therefor.

BACKGROUND ART

Along with the recent development of information and communication technology, various wireless communication technologies have been developed. Among them, Wireless Local Area Network (WLAN) enables wireless access to the Internet based on radio frequency technology through a portable terminal such as a Personal Digital Assistant (PDA), a laptop computer, a Portable Multimedia Player (PMP) in a home, an office, or a specific service providing area.

The introduction of Wi-Fi Direct or Wi-Fi Peer-to-Peer (Wi-Fi P2P) is under discussion, as a direct communication technology that facilitates interconnection between devices without a wireless Access Point (AP) which is a basic requirement for a legacy WLAN system. According to Wi-Fi Direct, devices can be connected to each other without a complex establishment procedure and an operation for exchanging data at a communication rate offered by a general WLAN system can be supported to provide various services to users.

Recently, various Wi-Fi-enabled devices have been used. Among them, the number of Wi-Fi Direct-enabled devices which are Wi-Fi devices capable of communicating with each other without an AP is increasing. The Wi-Fi Alliance (WFA) has been discussing the introduction of a platform supporting various services (e.g., Send, Play, Display, Print, etc.) using a Wi-Fi Direct link. This may be referred to as Wi-Fi Direct Service (WFDS). According to WFDS, applications, services, etc. can be controlled or managed by a service platform called Application Service Platform (ASP).

A standard on a wireless LAN (WLAN) technology is developing in IEEE (Institute of Electrical and Electronic Engineers) 802.11 group. IEEE 802.11a and b use an unlicensed band in 2.4 GHz or 5 GHz and IEEE 802.11b provides transmission speed of 11 Mbps, and IEEE 802.11a provides transmission speed of 54 Mbps. IEEE 802.11g provides transmission speed of 54 Mbps by applying OFDM (Orthogonal Frequency Division Multiplexing) in 2.4 GHz. IEEE 802.11n provides transmission speed of 300 Mbps by applying MIMO-OFDM (Multiple Input Multiple Output-OFDM). IEEE 802.11n supports a channel bandwidth up to 40 MHz. In this case, IEEE 802.11n can provide transmission speed of 600 Mbps.

In WLAN environment according to IEEE 802.11e, a DLS (Direct Link Setup)-related protocol assumes that a BSS (Basic Service Set) corresponds to a QBSS (Quality BSS) supporting a QoS (Quality of Service). In the QBSS, not only a non-AP STA but also an AP corresponds to a QAP (Quality AP) that supports QoS. Yet, in a currently commercialized WLAN environment (e.g., WLAN environment according to IEEE 802.11a/b/g), although a non-AP STA corresponds to a QSTA (Quality STA) supporting QoS, most of APs correspond to a legacy AP incapable of supporting QoS. As a result, even a QSTA has a limit on using a DLS service in the currently commercialized WLAN environment.

A TDLS (Tunneled Direct Link Setup) corresponds to a wireless communication protocol newly proposed to overcome the aforementioned limit. Although the TDLS does not support QoS, the TDLS can make QSTAs establish a direct link in the currently commercialized WLAN environment such as IEE 802.11a/b/g and enable a direct link to be established in a PSM (power save mode). Hence, the TDLS regulates various procedures to make QSTAs establish a direct link in a BSS managed by a legacy AP as well. In the following, a wireless network supporting the TDLS is referred to as a TDLS wireless network.

A legacy wireless LAN mainly handles an operation of an infra structure BSS in which a wireless access point (AP) functions as a hub. An AP is in charge of a function of supporting a physical layer for establishing a wired/wireless connection, a function of routing devices in a network, a function of providing a service for adding/deleting a device to/from a network, and the like. In this case, the devices in the network are connected with each other via the AP and the devices are not directly connected with each other.

As a technology of supporting a direct connection between devices, discussion on establishing a standard for Wi-Fi Direct is in progress.

A Wi-Fi direct network corresponds to a network that Wi-Fi devices are able to perform D2D (Device to Device) (or P2P (Peer-to-Peer)) communication with each other although the Wi-Fi devices do not participate in a home network, an office network, and a hotspot network. The Wi-Fi direct network has been proposed by Wi-Fi Alliance. In the following, Wi-Fi Direct-based communication is referred to as Wi-Fi D2D communication (simply, D2D communication) or Wi-Fi P2P communication (simply, P2P communication). And, a device for performing the Wi-Fi P2P is referred to as a Wi-Fi P2P device, simply, a P2P device.

A WFDS network can include one or more Wi-Fi devices. A WFDS device includes devices supporting Wi-Fi such as a display device, a printer, a digital camera, a projector, a smartphone, and the like. And, the WFDS device includes a non-AP STA and an AP STA. WFDS devices belonging to a WFDS network can be directly connected with each other. Specifically, P2P communication may indicate a case that a signal transmission path between two WFDS devices is directly configured between the WFDS devices without passing through the third device (e.g., an AP) or a legacy network (e.g., accessing WLAN via an AP). In this case, the signal transmission path directly configured between the two WFDS devices can be restricted to a data transmission path. For example, the P2P communication may indicate a case that a plurality of non-STAs transmit data (e.g., voice/image/text message information, etc.) without passing through an AP. A signal transmission path for control information (e.g., resource allocation information for P2P configuration, wireless device identification information, etc.) can be directly configured between WFDS devices (e.g., between a non-AP STA and a non-AP STA, between a non-AP STA and an AP), can be configured between two devices (e.g., between a non-AP STA and a non-AP STA) via an AP, or can be configured between an AP and a corresponding WFDS device (e.g., between an AP and a non-AP STA #1, between an AP and a non-AP STA #2).

Wi-Fi Direct corresponds to a network connection standard technology for defining up to an operation of a link layer. Since a standard on an application, which is operating in a higher layer of a link configured by the Wi-Fi Direct, is not defined, when an application is executed after devices supporting the Wi-Fi Direct are connected with each other, it was difficult to support compatibility. In order to solve the aforementioned problem, discussion on standardizing such a higher layer application as a Wi-Fi direct service (WFDS) is in progress in Wi-Fi Alliance (WFA).

FIG. 1 illustrates components of a WFDS (Wi-Fi Direct Service) framework.

Referring to FIG. 1, a Wi-Fi Direct layer is a MAC layer defined by the Wi-Fi Direct standard. The Wi-Fi Direct layer may include software compatible with the Wi-Fi Direct standard. A wireless connection may be configured by a PHY layer (not shown) compatible with the Wi-Fi PHY layer, under the Wi-Fi Direct layer. A platform called Application Service Platform (APS) is defined above the Wi-Fi Direct layer.

The ASP is a common shared platform and performs session management, service command processing, and control and security between ASPs between its overlying Application layer and its underlying Wi-Fi Direct layer.

A Service layer is defined above the ASP. The Service layer includes use case-specific services. The WFA defines four basic services, Send, Play, Display, and Print. Also, an Enable Application Program Interface (API) is defined to use an ASP common platform when a third party application other than the basic services is supported.

While Send, Play, Display, Print, or services defined by third party applications are shown in FIG. 1 as exemplary services, the scope of the present invention is not limited thereto. For example, the term "service" may mean any of services supporting Wi-Fi Serial Bus (WSB), Wi-Fi Docking, or Neighbor Awareness Networking (NAN), in addition to Send, Play, Display, Print, or the services defined by the third party applications.

Send is a service and application that can perform file transfer between two WFDS devices. Play is a service and application that enable sharing or streaming of Digital Living Network Alliance (DLNS)-based Audio/Video (A/V), photos, music, etc. between two WFDS devices. Print is a service and application that enable output of text and photos between a device having content such as text, photos, etc. and a printer. Display is a service and application that enable screen sharing between a Miracast source and a Miracast sink of the WFA.

The Application layer may provide a User Interface (UI), represent information as a human-perceivable form, and provide a user input to a lower layer.

DISCLOSURE OF THE INVENTION

Technical Task

The present invention is directed to a method of performing discovery. Particularly, the technical task of the present invention is to provide a method of enabling an advertiser to actively advertise its service and seek another service and a method of enabling a single device to simultaneously perform roles of an advertiser and a seeker.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided is a method of performing discovery by a device supporting Wi-Fi Direct, including: calling a SeekService method and an AdvertiseService method in a service layer; and transmitting a probe request based on at least one of the SeekService method and the AdvertiseService method. In this case, when a type field of the SeekService method is active and a periodic field of the AdvertiseService method is equal to or greater than 1, the probe request may include a service hash generated from service_name of the SeekService method, a service hash generated from service_name of the AdvertiseService method, and an advertisement ID.

In another aspect of the present invention, provided is a device supporting Wi-Fi Direct, including a transmitting device and a processor. In this case, when a SeekService method and an AdvertiseService method are called by a service layer, the processor may be configured to transmit a probe request based on at least one of the SeekService method and the AdvertiseService method. In addition, when a type field of the SeekService method is active and a periodic field of the AdvertiseService method is equal to or greater than 1, the probe request may include a service hash generated from service_name of the SeekService method, a service hash generated from service_name of the AdvertiseService method, and an advertisement ID.

When the type field of the SeekService method is active and the periodic field of the AdvertiseService method is 0, the probe request may include only the service hash generated from the service_name of the SeekService method.

In this case, the service hash generated from the service_name of the AdvertiseService method may be used in hash matching with a probe request received by the device.

When the type field of the SeekService method is passive and the periodic field of the AdvertiseService method is equal to or greater than 1, the probe request may include only the service hash generated from the service_name of the AdvertiseService method and the advertisement ID.

In this case, the service hash generated from the service_name of the SeekService method may be used in hash matching with a probe request received by the device.

When the periodic field of the AdvertiseService method is n, the probe request may be transmitted with a period of n beacon intervals.

Advantageous Effects

According to the present invention, an advertiser can actively advertise its service and seek another service. In addition, a single device can simultaneously perform roles of an advertiser and a seeker.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
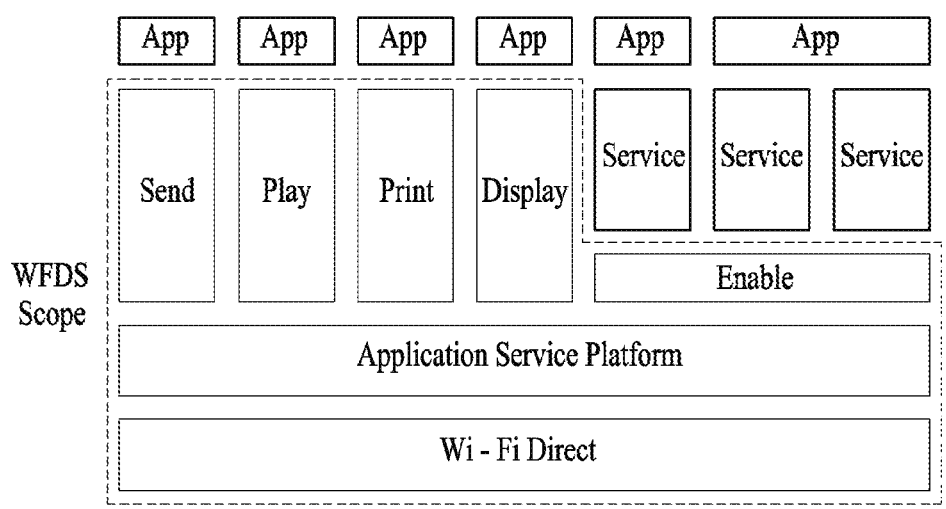
FIG. 1 is a diagram illustrating an exemplary structure of a WFDS (Wi-Fi Direct service) system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc.

WFD Device Discovery

A WFD source can discover a peer device for WFD, i.e., a WFD sink, via WFD device discovery.

Figure 2:
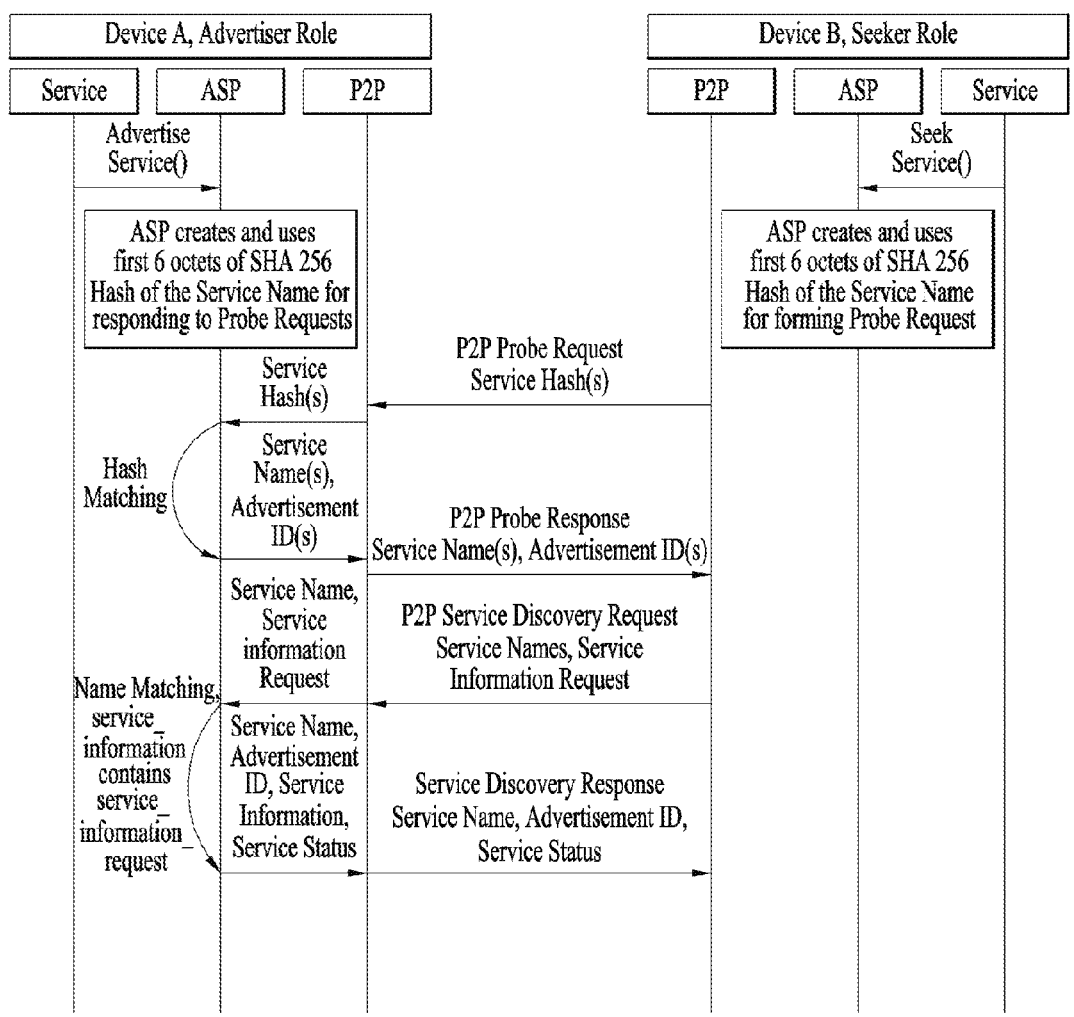
FIGS. 2 and 3 illustrate WFDS device/service discovery procedures.

For the WFD device discovery, WFD devices can include a WFD IE (information element) in a beacon, a probe request frame, a probe response frame and the like. In this case, the WFD IE corresponds to an information element including information on WFD such as a device type, a device state and the like. Regarding the WFD IE, it shall be explained later in detail. If a WFD device receives a probe request frame including a WFD IE, the WFD device can transmit a probe response frame including a WFD IE of the WFD device in response to the probe request frame. If the WF device is associated with an infrastructure AP and the WFD device operates as a Wi-Fi P2P device, a WFD IE and a P2P information element can be included in the probe request frame. The probe response frame, which is transmitted in response to the probe request frame, is transmitted via a channel on which the probe request frame is received and the probe response frame can include both a P2P IE and a WFD IE. FIG. 2 illustrates a device discovery procedure and a service discovery procedure defined in WFDS 1.0.

Further details of the WFD device discovery, which are not mentioned above, could be found in the documents 'Wi-Fi Display Technical Specification' and/or 'Wi-Fi Peer-to-Peer (P2P) Technical Specification Wi-Fi Direct Service Addendum'. In addition, undescribed details of the embodiments could also be found in the documents.

WFD Service Discovery

If necessary, WFD sources and/or WFD sinks may discover service capabilities of each other after performing the WFD device discovery. Specifically, if any one of WFD devices transmits a service discovery request frame, which contains a WFD capability as an information sub-element, a peer WFD device may transmit a service discovery response frame containing its WFD capability as an information sub-element in response to the service discovery request frame. In addition, to perform the service discovery procedure, a probe request frame and a probe response frame used for the device discovery procedure may contain information indicating whether the WFD devices have capabilities to support the service discovery procedure.

Figure 3:
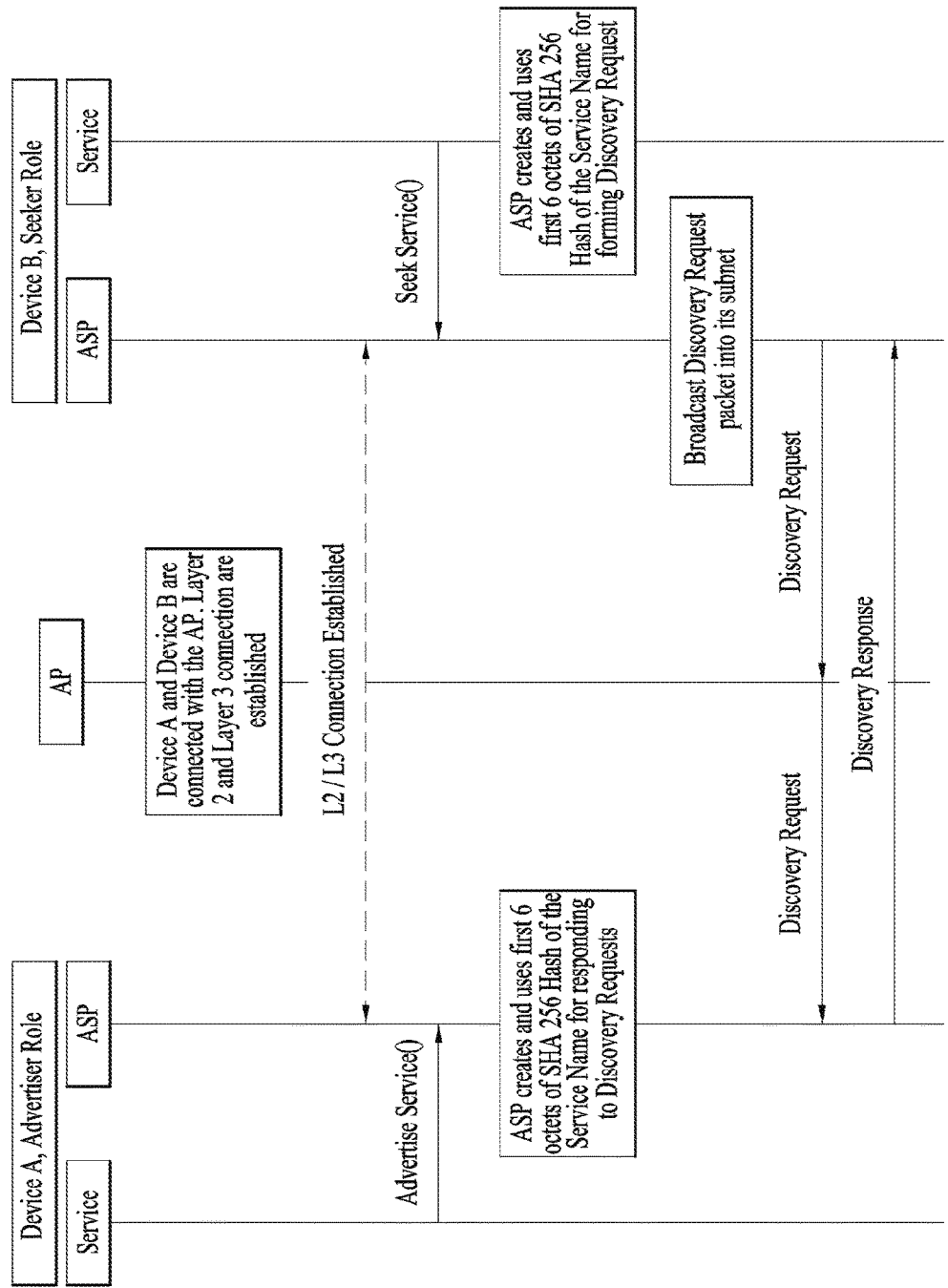

FIG. 3 illustrates a procedure in which a seeker discovers a device and service through UDP. When two devices are connected to an AP, a specific port (or an ASP coordination protocol port) is opened. An ASP may broadcast a discovery request packet to the entire subnet through the specific port. After matching the packet with a service, an advertiser unicasts a discovery response frame containing information on the corresponding device and service to the AP.

According to the aforementioned device and/or service discovery procedures, a seeker device should transmit a P2P probe request frame to discover a device that the seeker device desires. In addition, after receiving the request from the seeker device, an advertiser device determines whether its service matches the requested service. When the advertiser device's service matches the requested service, the advertiser device responds via unicast. In other words, the seeker and the advertiser have different transmittable P2P MAC action frames. Moreover, after discovering a device that can support the corresponding service, the seeker can request the device to transmit details of the corresponding service through a P2P service discovery request.

Hereinafter, a method of performing discovery when a single device simultaneously works as a service advertiser and a service seeker will be described.

Embodiment 1

The first embodiment relates to a discovery method when a service advertiser actively transmits a P2P probe request. It will be described with reference to FIG. 4.

Figure 4:
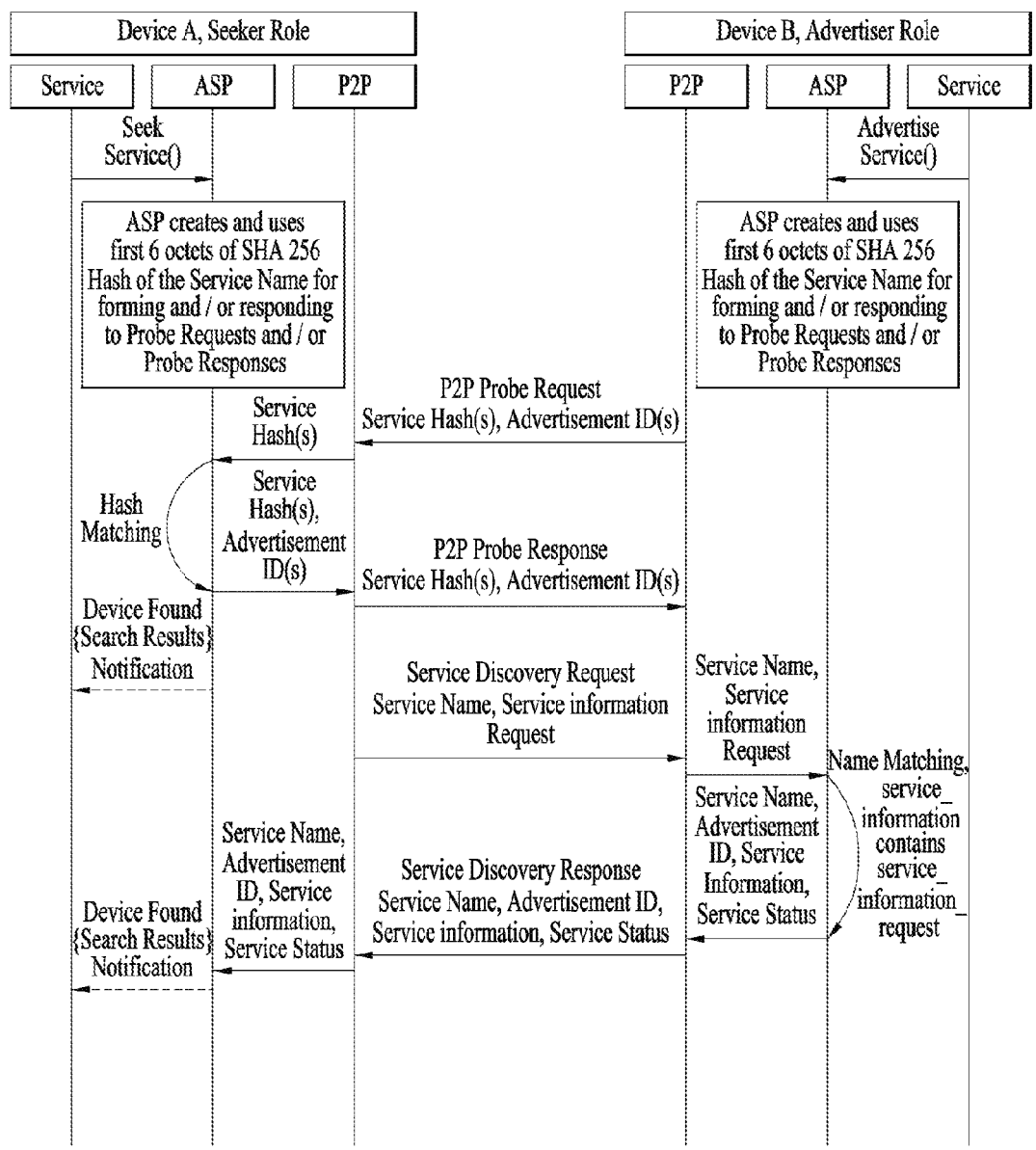
FIGS. 4 to 6 illustrate methods of performing discovery according to embodiment of the present invention.

Referring to FIG. 4, device A may transmit SeekService to an ASP in its service layer to seek a service and device B may transmit AdvertiseService to an ASP in its service layer to advertise a service. After receiving the SeekService and AdvertiseService (i.e., after the SeekService and AdvertiseService are called), the ASP may generate a hash value to be included in a P2P probe request or a P2P probe response (a service layer needs to comply with a method call to perform an action based on the contents of an event). In this case, the device B corresponding to the advertiser may transmit the probe request and the probe request may include a service hash value and an advertisement ID. To this end, P2P information elements shown in Tables 1 and 2 can be used.

TABLE 1

| Field | Size (octets) | Value | Description |
| --- | --- | --- | --- |
| Attribute ID | 1 | xx | Identifying the type of P2P attribute. The specific value is defined in Table x (P2P Attribute ID definitions). |
| Length | 2 | variable | Length of the following fields in the attribute. |
| Advertised Service Hash Descriptor(s) | Sum of all Advertised Service Hash Descriptor(s) | variable | List of Advertised Service Hash Descriptor(s). |

TABLE 2

| Field | Size (octets) | Value | Description |
| --- | --- | --- | --- |
| Service Hash(s) | 6 | variable | Contains Service Hash value. A Service Hash is 6 octet value of hash of UTF-8 Service Name. |
| Advertisement ID | 4 | 0x00000000-0xFFFFFFFF | Advertisement ID of corresponding Service |
| MAC Address | 6 | Variable | P2P device address of the P2P device |

In this case, the advertiser, device B may perform active scan due to a newly turned-on Wi-Fi interface. In some cases, the device B may be repeatedly in listen/search states due to failure in discovering a matched service. If the seeker desires to discover a service through passive scan, the seeker may search for a service after receiving the probe request from the advertiser.

The advertiser, device B may autonomously call an AdvertiseService method and then transmit the probe request based on the AdvertiseService method. However, it may be performed according to a specific primitive of the AdvertiseService method. Alternatively, when the device B fails to receive a probe request for a service that the device B desires during a predetermined time, the device B may perform the above-mentioned procedure. For example, if the device B fails to receive a probe request for a service corresponding to a service name included in an AdvertiseService method primitive during a prescribed time after calling the AdvertiseService method with respect to the ASP, the device B may transmit a probe request including a service hash, which is generated from the service name, and an advertisement ID.

Among seekers that receive the P2P probe request from the advertiser, a device that desires to discover the corresponding service through the SeekService, i.e., a device that desires to discover the same service through hash matching responds using the probe response. In this case, the P2P probe response and the P2P probe request may include the same hash value and advertisement ID. After transmitting the P2P probe response, the device informs a higher service provider that the device discovers the matched service through a device found event or SearchResult Event.

Figure 5:
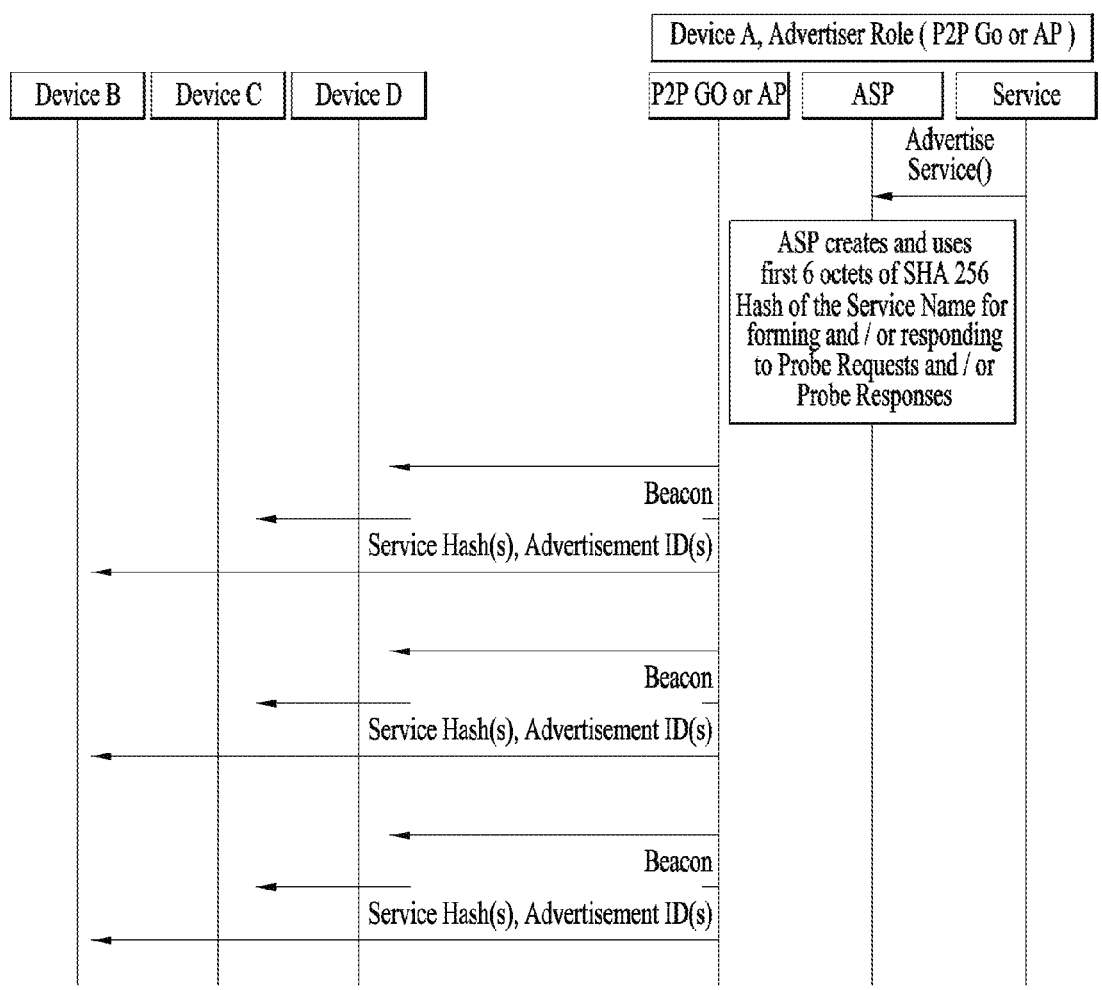

The seeker device may transmit a P2P service discovery request to check additional information of the service. In this case, the information contained in the P2P service request is the same as that defined in the legacy WFDS. After receiving the P2P service discovery request, the advertiser may inform the seeker of detailed information on its advertising service through a P2P service discovery response. After the seeker receives the P2P service discovery response, the P2P or ASP of the seeker informs the higher service provider that the seeker discovers the matched service through a device found event or SearchResult Event FIG. 5 shows an example in which device A, an advertiser seeks/advertises services through beacon frames. Referring to FIG. 5, device A calls an AdvertiseService method toward an ASP through its service layer and then, the ASP may generate a service hash. The generated service hash may be periodically transmitted to devices B, C, and D through beacon frames. In this case, a beacon frame may include a service hash and an advertisement ID as described with reference to Tables 1 and 2.

Figure 6:
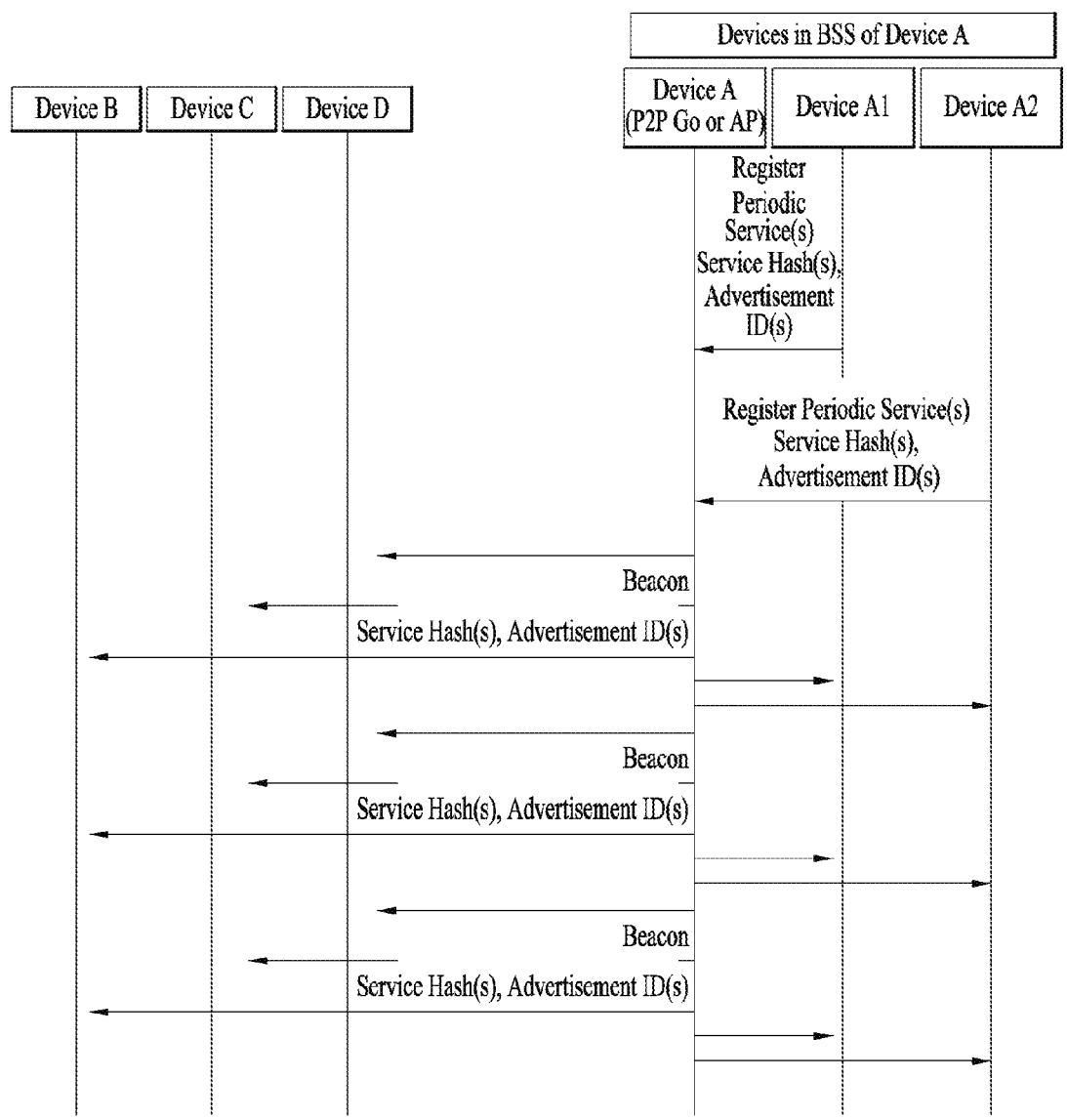
Figure 7:
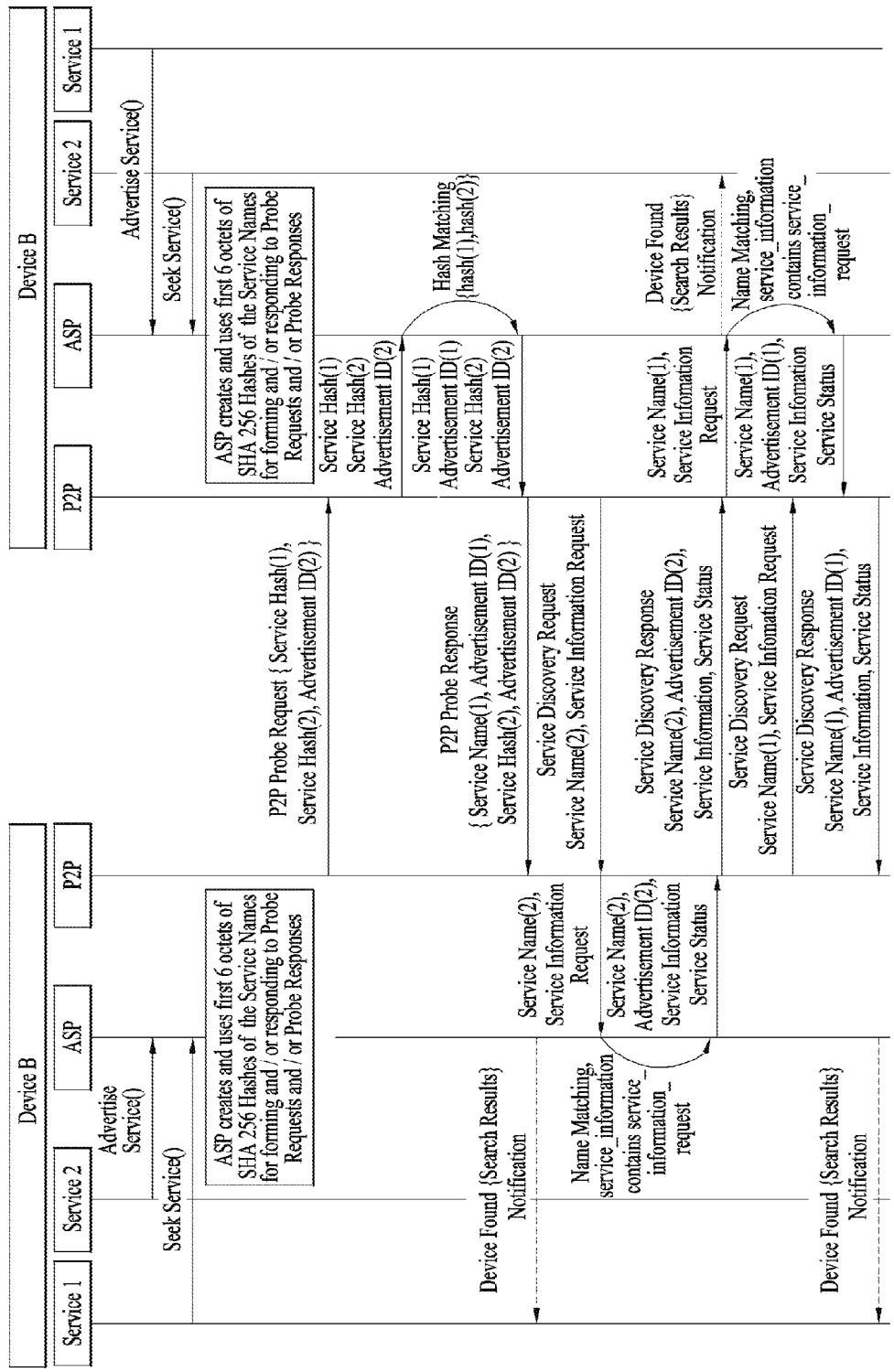
FIG. 7 illustrates a discovery method when a single device simultaneously performs roles of an advertiser and a seeker.

FIG. 6 shows a method by which a device belonging to a BSS informs neighboring device of services that the device can support through an AP or a P2P GO. In FIG. 6, devices A1 and A2 are included in the device A's BSS and the devices A1 and A2 perform AdvertiseService in their service layers using a periodic service advertisement method. The devices A1 and A2 request their AP to periodically perform service advertisement through 802.11aq or ANQP. The device A1 performs the periodic service advertisement for neighboring devices by gathering beacons or probe requests.

In the above-mentioned description, primitives of the AdvertiseService method may be as follows: AdvertiseService (service_name, auto_accept, service_information, service_status, network_role, network_config, deferred_session_response, periodic). When a value of 'periodic' is 0, periodic advertisement is not used or advertisement is not performed. On the other hand, when the value of 'periodic' is 1, it may indicate that the operation performed in the conventional WFDS is performed (i.e., a service hash is generated and hash matching is performed after reception of a probe response). In other words, when the value of 'periodic' is 1, it may indicate the use of the periodic advertisement. When the value of 'periodic' is n (where n>1), it may indicate that the periodic advertisement is transmitted with a period of n*100 ms (or beacon interval)

In addition, primitives of the SeekService method may be as follows: SeekService (service_name, exact_search, mac_address, service_information_request, type). When 'type' is passive, passive discovery may be performed for device/service discovery. Alternatively, a beacon or probe request may be broadcasted for the service discovery. On the other hand, when 'type' is active, as an active scan method, the probe request may be broadcasted through a corresponding radio channel for the device/service discovery. In the case of failure in discovering the device/service, the channel may be changed. When the passive service discovery is used, it is possible to minimize device battery consumption by optimizing sleep mode of the device, which is dependent on device implementation.

Embodiment 2

The second embodiment relates to a service discovery method when a WFDS device can perform both roles of an advertiser and a seeker. That is, this embodiment is directed to a method for simultaneously performing seeking of service 2 and advertising of service 1 through P2P probe requests.

Specifically, device A may call a SeekService method and an AdvertiseService method toward an ASP in its service layers and then transmit a probe request based on at least one of the SeekService method and the AdvertiseService method. In this case, if a type field of the SeekService method is active and a periodic field of the AdvertiseService method is equal to or greater than 1, a P2P probe request may include a service hash (Service Hash (1)), which is generated from service_name of the SeekService method, a service hash (Service Hash(2)), which is generated from service_name of the AdvertiseService method, and an advertisement ID (Advertisement ID(2)).

The device B advertises the service 1 while seeking the service 2 through a passive type of SeekService. In this case, the device B performs hash matching using the P2P probe request received from the device A. When the device B completes passive discovery of the service 2, an ASP of the device B can perform device found notification with respect to the service 2.

A P2P probe response transmitted from the device B includes a service name (Service Name(1)) and an advertisement ID (Advertisement ID(1)) for the service 1. In addition, the P2P probe response includes the service hash (Service Hash(2)) and the advertisement ID (Advertisement ID(2)) for the service 2, which are proposed in the present invention.

After receiving the P2P probe response, the device A can know that the device B currently advertises the service 1 and then transmit device/service found notification to a service layer for the higher service, service 1. Thereafter, the device A, the seeker of the service 1 and the device B, the seeker of the service 2 can exchange detailed information of the corresponding services with each other through a P2P service discovery procedure according to the method defined in the legacy WFDS and then be aware of the detailed information.

If the type field of the SeekService method is active and the periodic field of the AdvertiseService method is 0, the probe request may include only the service hash generated from service_name of the SeekService method. In this case, the service hash generated from the service_name of the AdvertiseService method may be used in hash matching with a probe request received by the device.

If the type field of the SeekService method is passive and the periodic field of the AdvertiseService method is equal to or greater than 1, the probe request may include only the service hash generated from the service_name of the AdvertiseService method and the advertisement ID. In this case, the service hash generated from the service_name of the SeekService method may be used in hash matching with the probe request received by the device.

Figure 8:
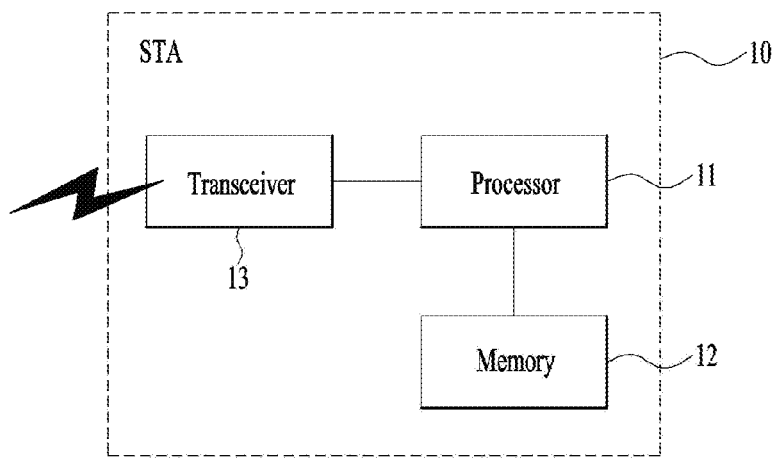
FIGS. 8 and 9 are block diagrams illustrating a configuration of a wireless device according to an embodiment of the present invention.

FIG. 8 is a block diagrams illustrating a configuration of a wireless device according to an embodiment of the present invention.

Referring to FIG. 8, a wireless device 10 may include a processor 11, a memory 12, and a transceiver 13. The transceiver 13 capable of transmitting/receiving radio signals can be used to implement a physical layer according to, for example, the IEEE 802 system. The processor 11 can be connected to the transceiver 13 electrically in order to implement the physical layer and/or MAC layer according to the IEEE 802 system. In addition, the processor 11 may be configured to perform operations for at least one of the application, service and ASP layers according to the aforementioned various embodiments of the present invention. Alternatively, the processor 11 may be configured to perform operations related to a device operating as an AP/STA. Moreover, a module for implementing operations of the wireless device according to the aforementioned various embodiments of the present invention may be saved in the memory 12 and then driven by the processor 11. The memory 12 may be included inside the processor 11 or be provided outside the processor 11. And, the memory 12 can be connected to the processor 11 through known means.

The detailed configuration of the wireless device 10 of FIG. 8 can be implemented such that each of the aforementioned various embodiments of the present invention is applied independently or at least two thereof are simultaneously applied. Here, redundant description shall be omitted for clarity.

Figure 9:
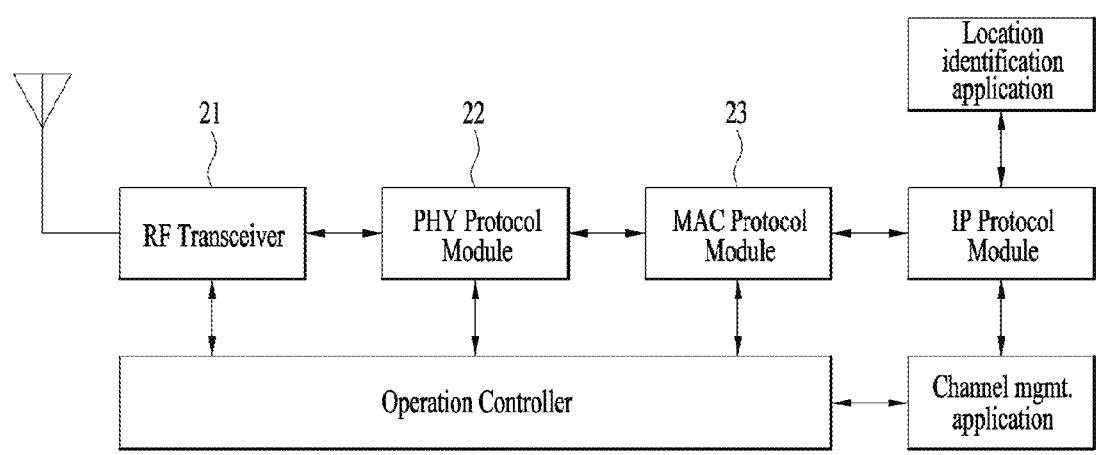

FIG. 9 is a block diagram for another configuration of a wireless device according to an embodiment of the present invention.

Referring to FIG. 9, an RF transceiver 21 moves an information created by a PHY protocol module 22 to an RF spectrum and then transmits the information through an antenna by performing filtering/amplification. Alternatively, the RF transceiver 21 moves an RF signal received through the antenna to a band that can be processed by the PHY protocol module. To this end, the RF transceiver 21 is in charge of managing a process such as filtering or the like. The RF transceiver 21 may include a switching function for switching between the transmitting and receiving functions.

The PHY module 22 performs a role of transferring data to the RF transceiver 21 in a manner of performing a processing such as FEC encoding and modulation, insertion of additional signals such as a preamble and a pilot, or the like on data of which transmission is requested by an MAC protocol module 23. And, the PHY module 22 performs a role of transferring data to the MAC protocol module 23 through a process for performing demodulation, equalization, FEC decoding, elimination of the signal added in the PHY layer, and the like on a reception signal delivered from the RF transceiver 21 at the same time. To this end, a modulator, a demodulator equalizer, an FEC encoder, an FEC decoder and the like may be included in the PHY protocol module 22.

The MAC protocol module 23 performs a process necessary to transfer or transmit data transferred from an upper layer to the PHY protocol module 22 and is charge of additional transmissions in order to perform basic communication. To this end, the MAC protocol module 23 processes data, of which transmission is requested by the upper layer, to be appropriate for transmission and then transfers or transmits the processed data to the PHY protocol module 22. And, the MAC protocol module 23 processes reception data transferred from the PHY protocol module 22 and performs a role of transferring the processed data to the upper layer. Moreover, the MAC protocol module 23 is also in charge of processing a communication protocol by being responsible for other additional transmissions and receptions necessary for data transfer.

The aforementioned embodiments of the present invention can be implemented using various means. For instance, the embodiments of the present invention can be implemented using hardware, firmware, software and/or any combinations thereof.

In the case of implementation by hardware, methods according to the embodiments of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In the case of implementation by firmware or software, methods according to the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the embodiments described herein, but should be accorded the broadest scope consistent with the principles and novel features disclosed herein.

INDUSTRIAL APPLICABILITY

Although the various embodiments of the present invention have been described focusing on the IEEE 802.11 system, the present invention can also be applied to various mobile communication systems in the same manner.

What is claimed is:

1. A method of performing discovery by a device supporting Wi-Fi Direct, the method comprising:
    calling a SeekService method and an AdvertiseService method in a service layer; and
    transmitting a probe request based on at least one of the SeekService method or the AdvertiseService method,
    wherein, when a type field of the SeekService method is active and a periodic field of the AdvertiseService method is equal to or greater than 1, the probe request includes a service hash generated from service_name of the SeekService method, a service hash generated from service_name of the AdvertiseService method, and an advertisement ID,
    wherein, when the type field of the SeekService method is active and the periodic field of the AdvertiseService method is 0, the probe request includes only the service hash generated from the service name of the SeekService method, and
    wherein, when the type field of the SeekService method is passive and the periodic field of the AdvertiseService method is equal to or greater than 1, the probe request includes only the service hash generated from the service name of the AdvertiseService method and the advertisement ID.

2. The method of claim 1, wherein the service hash generated from the service_name of the AdvertiseService method is used in hash matching with a probe request received by the device.

3. The method of claim 1, wherein the service hash generated from the service_name of the SeekService method is used in hash matching with a probe request received by the device.

4. The method of claim 1,
    wherein, when the periodic field of the AdvertiseService method is n, the probe request is transmitted with a period of n beacon intervals, and
    wherein the n is a positive natural number larger than 1.

5. A device supporting Wi-Fi Direct, the device comprising:
    a transmitting device; and
    a processor,
    wherein the processor is configured to, when a SeekService method and an AdvertiseService method are called by a service layer, transmit a probe request based on at least one of the SeekService method or the AdvertiseService method, and
    wherein, when a type field of the SeekService method is active and a periodic field of the AdvertiseService method is equal to or greater than 1, the probe request includes a service hash generated from service_name of the SeekService method, a service hash generated from service_name of the AdvertiseService method, and an advertisement ID,
    wherein, when the type field of the SeekService method is active and the periodic field of the AdvertiseService method is 0, the probe request includes only the service hash generated from the service name of the SeekService method, and
    wherein, when the type field of the SeekService method is passive and the periodic field of the AdvertiseService method is equal to or greater than 1, the probe request includes only the service hash generated from the service name of the AdvertiseService method and the advertisement ID.

6. The device of claim 5, wherein the service hash generated from the service_name of the AdvertiseService method is used in hash matching with a probe request received by the device.

7. The device of claim 5, wherein the service hash generated from the service_name of the SeekService method is used in hash matching with a probe request received by the device.

8. The device of claim 5,
    wherein, when the periodic field of the AdvertiseService method is n, the probe request is transmitted with a period of n beacon intervals, and
    wherein the n is a positive natural number larger than 1.

* * * * *